Sept. 21, 1926.
V. H. HARBERT
RETAINING VALVE ANCHOR
Filed Sept. 8, 1925
1,600,816
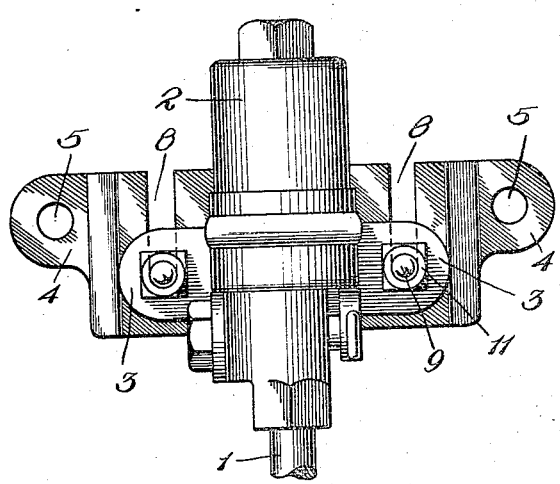
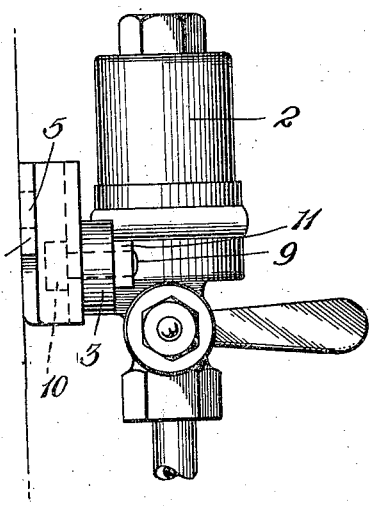
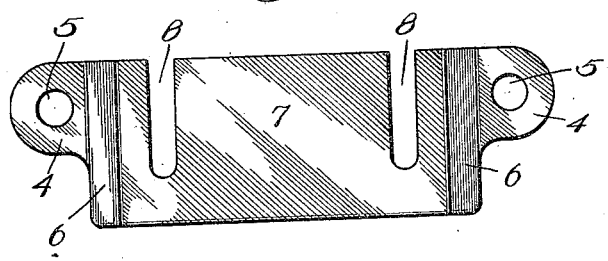
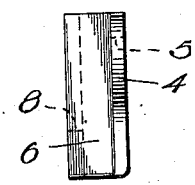
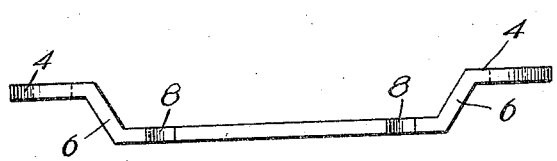
Inventor
Victor H Harbert
By Edwin S. Clarkson
Attorney Patented Sept. 21, 1926.

1,600,816

UNITED STATES PATENT OFFICE.

VICTOR H. HARBERT, OF SPRINGFIELD, ILLINOIS.

RETAINING-VALVE ANCHOR.

Application filed September 8, 1925. Serial No. 55,196.

Retaining valves are applied to cars to make movement of train safe, and to conserve the supply of air, and this valve, when set and in good working order, does not allow all of the air to escape from the brake cylinders, but retains a certain amount of pressure therein sufficient to hold the brakes in a set position, while the air is being replenished in the train line. When the air pressure in the line is increased or replenished, if the retaining valve is in an inoperative condition, the triple valve will automatically assume a released position allowing all of the air to escape from the brake cylinder, releasing the brakes, and allowing the train to gain momentum, and run out of control. It is, therefore, of the utmost importance that the retaining valve be in good working order at all times.

Retaining valves have in the past been secured to cars by lag screws and by bolts, the retaining valve being located on the outside at the end of the car and near the top of the car. When bolts are used, and this has been the most universal way of securing valves to the car, the bolts extend from the inside of the car, the nuts on the end of the bolt being on the outside of the car. This type of fastening has been found objectionable from many standpoints, in that the lag screws and bolts work loose to such an extent that the service movements of a car tend to give a sidewise movement to the retaining valve, which, with the pipe leading from the air brake system of the car, moves somewhat after the fashion of a pendulum. Such condition is prohibited by the United States safety appliance laws, inasmuch as it reduces the efficiency of the brake system, besides endangering the lives of trainmen. Another objection is that in case of bolts, the heads of which are on the inside of the car; if these bolts become loose during transit, the only way to get at the bolt is to unload the car, which can only be done at great expense, and sacrifices the safety of the goods removed from the car, and increases the liability of the railroad for damage and stolen goods.

One of the objects of my invention is to provide a retaining valve bracket of simple but effective construction, and one that can be manufactured at comparatively low cost.

Another object of my invention is to provide a retaining valve bracket which may be readily attached to the outside of the car wall, and which attachment need not be disturbed by applying or removing the retaining valve from the car.

Another object of my invention is to provide a retaining valve bracket which is provided with means to compensate for varying lengths of air pipe.

In the drawings:

Figure 1 is a front elevation of my improved bracket with a retaining valve mounted thereon.

Figure 2 is a side elevation of the same.

Figure 3 is a front elevation of the bracket detached from the car.

Figure 4 is a side elevation of Figure 3.

Figure 5 is a top plan view of Figure 3.

The reference numeral (1) designates the air pipe leading from the air brake system, to the upper end of which is secured the retaining valve (2), said valve having side lugs (3) provided with bolt openings.

My improved bracket comprises a substantially U shaped member provided with the base arms (4) having suitable bolt openings (5), from each of which base members extend spacing elements (6), said elements extending forwardly from the base members (4), and converging toward each other; said spacing members being connected at their outer ends by means of the plate (7), which is provided with elongated slots (8), the upper ends of which intersect the upper edge of plate (7).

In applying my bracket to the car, bolts or rivets are passed through the openings (5), and through the car walls, whereby the bracket is firmly secured against accidental displacement on the wall of the car, with the plate (7) spaced from the wall of the car.

While it is desired to hang a retaining valve on this bracket, the bolts (9) are loosely positioned in the bolt openings in the lugs (3) of the retaining valve, and the valve is raised to such position that the heads (10) of the bolts are back of the plate (7), and the body of the bolt immediately over the slot (8), whereby the valve is permitted to drop downwardly, and the bolts are positioned in the slots (8). Then the nuts (11) are screwed home on the bolts (9), thereby firmly anchoring the retaining valve to the bracket.

The elongated slots (8) provide for different vertical positions of the retaining valve which is controlled by the length of the pipe (1), and as this length varies it will be seen that this provision for the various positions of the retaining valve is of importance.

What I claim is:

1. A retaining valve bracket substantially U shape in cross section, and having elongated bolt opening intercepting the upper edge thereof.

2. A retaining valve bracket comprising a main body having elongated vertical slots therethrough intercepting the upper edge thereof, a spacing leg extending rearwardly from said body, each leg having an opening therethrough.

In testimony whereof I affix my signature.

VICTOR H. HARBERT.